March 7, 1961 R. G. NISLE 2,973,684
MAGNETO-OPTICAL ROTATION ANALYZER
Filed July 11, 1956 4 Sheets-Sheet 1

INVENTOR.
R.G. NISLE
BY *Hudson & Young*
ATTORNEYS

March 7, 1961 R. G. NISLE 2,973,684
MAGNETO-OPTICAL ROTATION ANALYZER
Filed July 11, 1956 4 Sheets-Sheet 3

INVENTOR.
R.G. NISLE
BY Hudson & Young
ATTORNEYS

March 7, 1961 R. G. NISLE 2,973,684
MAGNETO-OPTICAL ROTATION ANALYZER
Filed July 11, 1956 4 Sheets-Sheet 4

INVENTOR.
R.G. NISLE
BY Hudson & Young
ATTORNEYS

United States Patent Office 2,973,684
Patented Mar. 7, 1961

2,973,684

MAGNETO-OPTICAL ROTATION ANALYZER

Robert G. Nisle, Bartlesville, Okla., assignor to Phillips Petroleum Company, a corporation of Delaware Filed July 11, 1956, Ser. No. 597,196

2 Claims. (Cl. 88—14)

This invention relates to the analysis of sample materials by magneto-optical means.

A number of control systems have recently been developed for automatically controlling chemical processes. These systems have usually been based upon the continuous analysis of a sample stream to determine a selected property of the stream. This analysis has been made by the use of such instruments as mass spectrometers, infrared and ultra-violet analyzers, and refractometers, for example. An analyzer is provided in accordance with the present invention which is based upon a magneto-optical rotation effect. It is known that the plane of polarization of a beam of plane polarized light is rotated if the beam is transmitted through a transparent isotropic medium positioned in a magnetic field. The degree of rotation is a function of the particular material through which the beam is passed.

In accordance with the present invention, a sample of material to be tested is disposed in a magnetic field. A beam of plane polarized light is directed through the sample material. The emerging beam is then split into two separate beams which are directed through respective rotatable polarized light analyzers to impinge upon individual detectors. The outputs of the two detectors are compared and the resulting differential signal is applied through suitable servo means to rotate the two analyzers in unison. The analyzers are initially displaced from one another so that one provides less than maximum transmission when the second provides maximum transmission. The servo system is adjusted so that the two anaylzers tend to be rotated to positions such that the differential output signal of the detectors becomes zero.

Accordingly, it is an object of this invention to provide apparatus for analyzing test materials in terms of the magneto-optical rotation properties of the materials.

Another object is to provide means for comparing the intensities of the two beams of polarized light.

Other objects, advantages and features of the invention should become apparent from the following detailed description which is taken in conjunction with the accompanying drawing, in which.

Figure 4A:
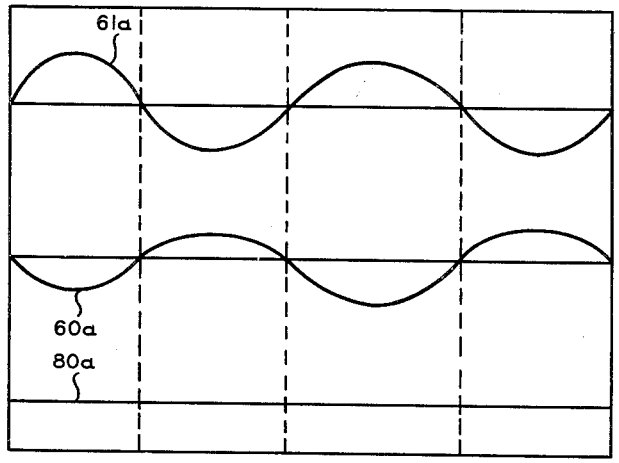
Figure 4B:
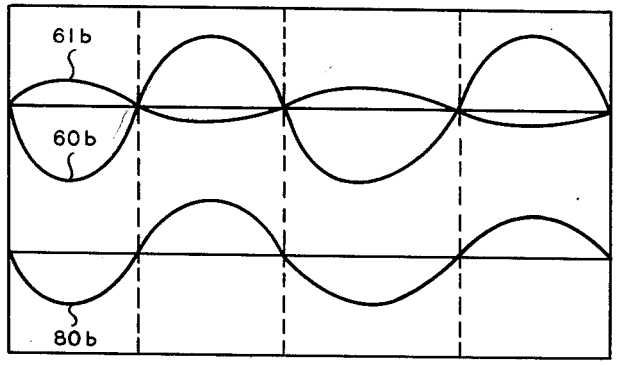
Figure 4C:
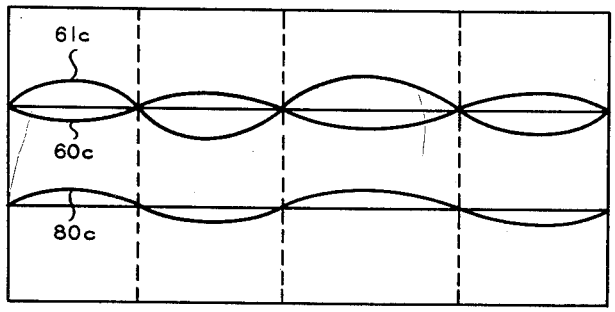

Figures 4a, 4b, and 4c are additional graphical representations of the operation of the servo control system.

Figure 5:
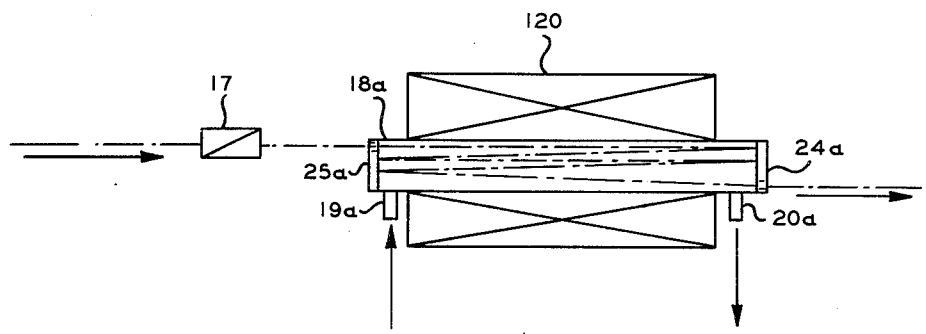

Figure 5 is a schematic view of a second embodiment of the sample cell and magnetic field producing means.

Figure 1:
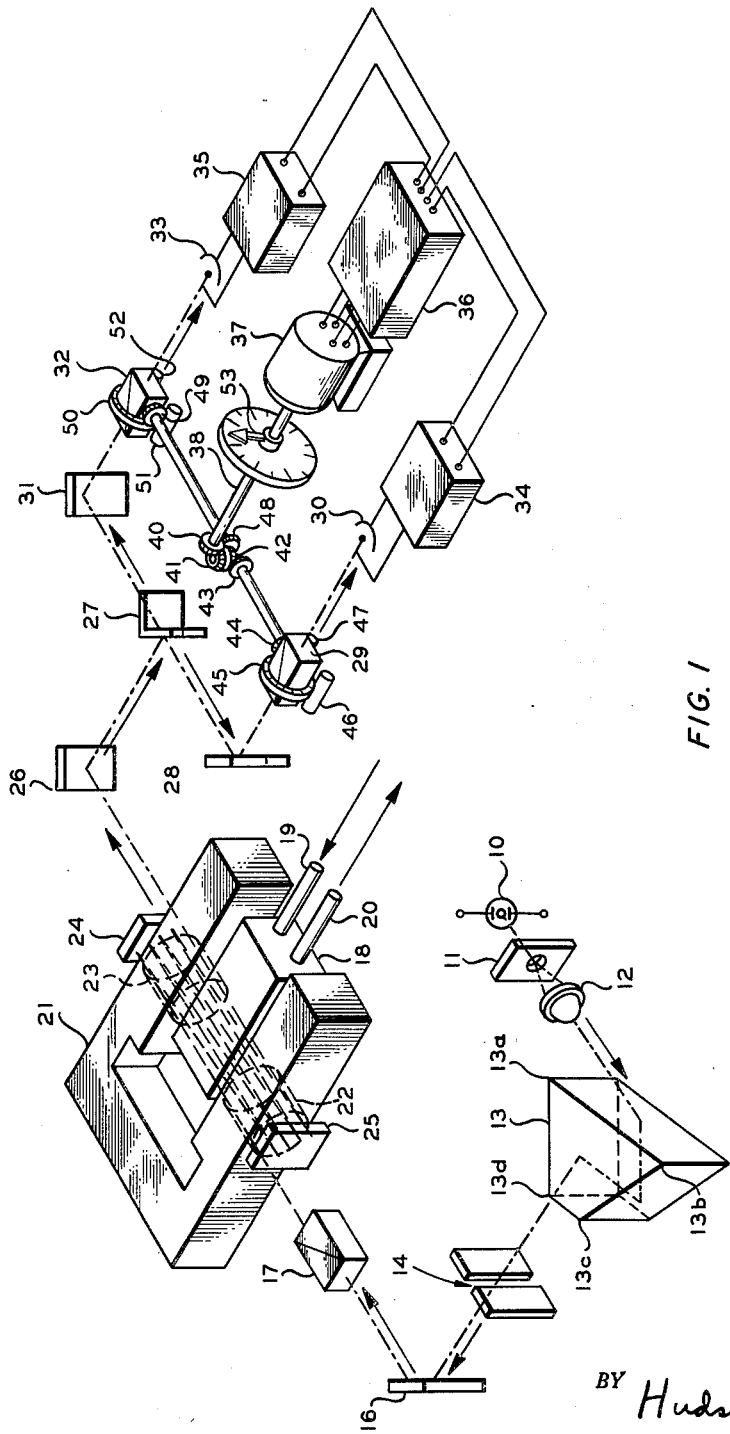
Figure 1 is a schematic representation of the optical system of the analyzer of this invention.

Referring now to the drawing in detail and to Figure 1 in particular, there is shown a source of radiation 10, which can be a mercury vapor lamp. Radiation from lamp 10 passes through an aperture 11 and is collimated by a converging lens 12. The resulting beam enters a monochromator prism 13 and emerges therefrom through a slit 14. The illustrated prism is preferred because the incident and reflected beams are at approximately right angles to one another. This is accomplished by constructing the prism so that the angles of the four corners 13a, 13b, 13c, and 13d are 90°, 75°, 135°, and 60°, respectively. The exit slit 14 can be moved to pass a selected wave length of light. Either the 5460 or 4446 Angstrom line can be used to advantage because both are strong lines and are relatively isolated from other lines in the spectrum.

The light beam transmitted through slit 14 is reflected by mirror 16 through a polarizer 17, which can be a Nicol prism. The resulting beam of plane polarized light is passed through a sample cell 18 which is provided with transparent windows. A sample fluid to be analyzed is circulated continuously through cell 18 by means of inlet 19 and outlet 20. Cell 18 is positioned in a magnetic field which is formed by a magnet 21, which can be either a permanent magnet or an electro-magnet. Apertures 22 and 23 are formed in the pole pieces of magnet 21 to permit the beam of radiation to be directed therethrough. Mirrors 24 and 25 are positioned adjacent respective apertures 23 and 22 so that the light beam is reflected through cell 18 a plurality of times. The magneto-optical rotation of a material depends only on the direction of the magnetic field, and not on the direction of light transmission. Thus, the multiple reflections through cell 18 result in the rotation of the plane of polarization of the light beam being increased. This facilitates the measurement of the rotation.

After passage through cell 18, the beam of radiation is reflected by a mirror 26 to a beam splitter 27 which comprises a pair of mirrors mounted at right angles to one another. One of the resulting beams is reflected by a mirror 28 through a polarized light analyzer 29 to impinge upon a detector 30. The second beam is reflected by a mirror 31 through a second analyzer 32 to impinge upon a second detector 33. The output signals of detectors 30 and 33 are amplified by respective amplifiers 34 and 35. The resulting signals are applied to respective inputs of a servo circuit 36 which energizes a reversible motor 37.

Analyzers 29 and 32, which advantageously are Nicol prisms, are geared to one another and to the drive shaft 38 of motor 37 so that rotation of motor 37 in one direction rotates the two analyzers in a first direction and rotation of the motor in a second direction rotates the two analyzers in opposite directions. A schematic representation of suitable gearing for this purpose is illustrated. Drive shaft 38 is connected through bevel gears 40, 41, 42, 43, 44, and 45 to prism 29. Bevel gear 45 is attached to prism 49 and rotates on guide wheels 46 and 47. Motor drive shaft 38 is similarly connected to prism 32 by means of bevel gears 40, 41, 42, 48, 49, and 50. Bevel gear 50 rotates on guides 51 and 52. An indicator dial 53 is also mounted on drive shaft 38. A telemetering potentiometer, not shown, can be attached to drive shaft 38 to provide an output electrical signal representative of the rotation of motor 37.

The instrument is calibrated initially by adjusting one of the analyzer prisms, 29, for example, for maximum light transmission. The second prism 32 is adjusted to provide approximately 50% of maximum light transmission. The prisms retain this relative position when rotated by motor 37. The amplifier and comparison circuits are adjusted so that the output signals of the two amplifiers are equal in amplitude and opposite in polarity. The input signal applied to circuit 36 is thus zero. If the plane of polarization of the light beam emerging from cell 18 is rotated, the relative intensity of the two signals received at detectors 30 and 33 is varied to change the balance condition. Motor 37 then rotates the two prisms until a new balance point is attained.

Figure 2:
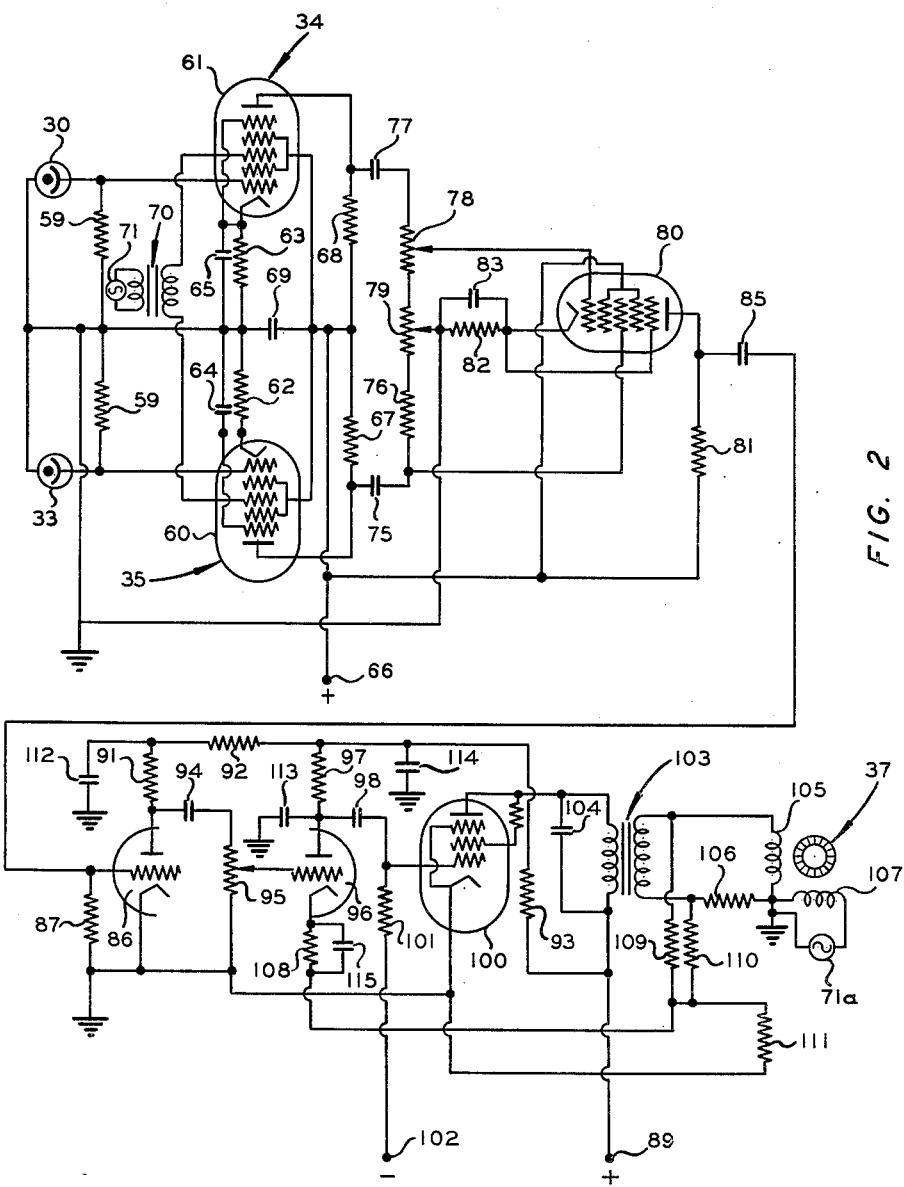
Figure 2 is a schematic circuit drawing of the light comparing and servo control system.
Figure 3:
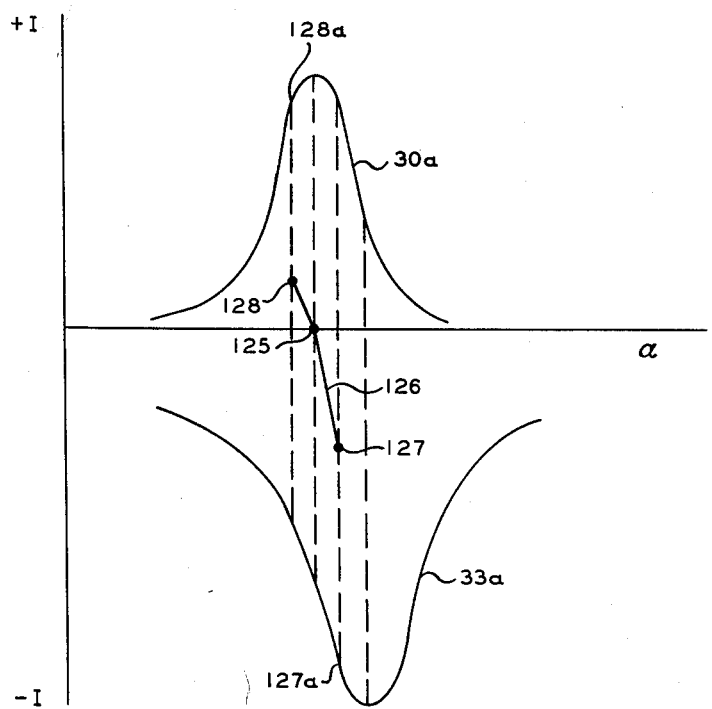
Figure 3 is a graphical representation of the operation of the servo control system.

This balancing operation can better be understood from a detailed consideration of Figures 2, 3 and 4. The first terminals of photovoltaic cells 30 and 33 are connected to one another and to ground. The second terminals of cells 30 and 33 are connected to the control grids of respective vacuum tubes 61 and 60, and to ground through respective resistors 59 and 58. Vacuum tubes can be types 6SA7, for example, which have five grids. The cathodes of tubes 60 and 61 are connected to ground through respective resistors 62 and 63 which are shunted by respective capacitors 64 and 65. The second and fourth grids of the two tubes are connected to a terminal 66 which is maintained at a positive potential. The anodes of tubes 60 and 61 are connected to terminal 66 through respective resistors 67 and 68. A capacitor 69 is connected between terminal 66 and ground. The fifth grids of the two tubes are connected to the respective cathodes thereof. The third grids of tubes 60 and 61 are connected to the respective end terminals of the secondary winding of a transformer 70. A source of alternating current 71 is connected across the primary winding of transformer 70.

The anode of tube 60 is connected through a capacitor 75 to the first terminal of a resistor 76. The anode of tube 61 is connected through a capacitor 77 to the first end terminal of a potentiometer 78. The second terminal of resistor 76 is connected to the first end terminal of a potentiometer 79. The second end terminals of potentiometers 78 and 79 are connected to one another. The contactor of potentiometer 78 is connected to the first grid of a vacuum tube 80, which also has five grids and can be type 6SA7. The junction between capacitors 75 and resistor 76 is connected to the third grid of tube 80. The second and fourth grids of tube 80 are connected to terminal 66. The anode of tube 80 is connected through a resistor 81 to terminal 66. The suppressor grid of tube 80 is connected to the cathode thereof, the latter being connected to the contactor of potentiometer 79 through a resistor 82 which is shunted by a capacitor 83.

The anode of tube 80 is connected through a capacitor 85 to the control grid of a triode 86. The control grid of triode 86 is connected to ground through a resistor 87. The cathode of triode 86 is connected to ground, and the anode thereof is connected to a positive potential terminal 89 through series connected resistors 91, 92, and 93. A capacitor 112 is connected between ground and the junction between resistors 91 and 92. The anode of triode 86 is also connected through a capacitor 94 to one end terminal of a potentiometer 95. The second end terminals of potentiometer 95 is connected to ground. The contactor of potentiometer 95 is connected to the control grid of a triode 96. The anode of triode 96 is connected to terminal 89 through series connected resistors 97 and 93. A capacitor 114 is connected between ground and the junction between resistors 97 and 93. The anode of triode 96 is also connected through a capacitor 98 to the control grid of a pentode 100. The control grid of pentode 100 is connected through a resistor 101 to a negative potential terminal 102. The suppressor grid and cathode of pentode 100 are connected to ground. The anode of pentode 100 is connected through the primary winding of a transformer 103 to terminal 89. A capacitor 104 is connected in parallel with the primary winding of transformer 103.

The secondary winding of transformer 103 is connected in series with a resistor 106 and the first winding 105 of a two phase induction motor 37. An alternating current source 71a is connected across the second winding 107 of motor 37. Current sources 71 and 71a are of the same frequency, and preferably are from a common source. The cathode of triode 96 is connected through series connected resistors 108 and 109 to the first end terminal of the secondary winding of transformer 103. A resistor 110 is connected between the second end terminal of secondary winding of transformer 103 and the junction between resistors 108 and 109. The junction between resistors 108 and 109 is also connected to ground through a resistor 111. A capacitor 115 is connected in parallel with resistor 108.

Vacuum tubes 60 and 61 comprise respective amplifiers 35 and 34. The output signals from the two amplifiers are alternating signals 180° out of phase with one another. This is accomplished by source 71 which pulses tubes 60 and 61. Potentiometers 78 and 79 permit the relative gains of the two signals applied to tube 80 to be adjusted. The initial balance condition is established by making these two signals of substantially equal amplitudes. The signals are 180° out of phase with one another. The output signal from tube 80 is amplified by tubes 86, 96 and 100 to drive motor 37. The direction of rotation of motor 37 is determined by the phase of the output signal from tube 80. This, in turn, is a function of the relative amplitudes of the signals from tubes 60 and 61.

As previously mentioned, prisms 29 and 32 initially are positioned so that the transmission through prism 29 is a maximum and the transmission through prism 32 is approximately 50% of maximum. Curve 30a of Figure 3 represents the intensity of the transmitted light through prism 29 as a function of the angle of rotation of the prism. Curve 33a represents the corresponding intensity of the light transmitted through prism 32. The relative gains of the two amplifiers associated with the detectors 30 and 33 are adjusted so that output signals from the amplifiers are of equal amplitude and opposite polarity at the initial balance condition. This is represented by a point 125 on curve 126 which represents the difference between curves 30a and 33a. A zero input signal is thus applied to circuit 36. It should be evident that the gain of amplifier 34 exceeds the gain of amplifier 35 to establish this balance, if detectors 30 and 31 are alike.

If the sample material in cell 18 should change in composition so that the plane of the polarized light is rotated in a first direction, the light transmitted through prism 32 is increased to a point such as 127a on curve 33a. This results in an increase in the output signal of detector 33 and a decrease in the output signal of detector 30. The output signal from tube 80, represented by point 127 on curve 126, is thus of a first polarity which rotates motor 37 in a direction so as to reduce the intensity of light transmitted through prism 32. Prism 29 is rotated simultaneously to increase its light transmission. This rotation continues until the output signals from the two detectors are again balanced. If the plane of the polarized light should be rotated in an opposite direction, more light is transmitted through prism 29. This results in an output signal such as is represented by point 128 on curve 126. Under this second condition, an output signal of second polarity is provided by tube 80. This second signal rotates motor 37 in the opposite direction to restore the initial balanced condition.

The operation of the servo system can perhaps better be understood by reference to Figures 4a, 4b and 4c. At the initial balance condition, the output signals of tubes 60 and 61 are of equal amplitude and opposite polarity, as indicated by respective curves 60a and 61a of Figure 4a. The output signal 80a of tube 80 is zero so that motor 37 remains stationary. If detector 33 receives a greater amount of light, the output signal 60b of tube 60 exceeds the signal 61b of tube 60, see Figure 4b. The output signal 80b of tube 80 is of first polarity to drive motor 37 in a first direction. If detector 30 receives a greater amount of light, the output signal 61c of tube 61 exceeds the signal 60c of tube 60, see Figure 4c. The output signal 80c of tube 80 is of second polarity to drive motor 37 in a second direction. The illustrated servo system is sensitive to extremely small changes in the relative intensity of light received by the two detectors. This is evident from the steepness of curve 126 of Figure 3.

The degree of rotation of motor 37 that is required to restore the balanced condition is an indication of the amount of rotation of the plane of polarization of the light beam transmitted through cell 18. This rotation ($\theta$) is represented by the following formula:

$$\theta = N\rho Hl,$$

where $N$ = number of passages through the magnetic field
$H$ = magnetic field strength
$l$ = length of cell
$\rho$ = Verdet's constant.

In Figure 5, there is shown a second embodiment of the cell assembly. Cell 18a is provided with end plates 24a and 25a which have polished inner surfaces to form mirrors. The polarized light beam which enters the cell from polarizer 17 is reflected through cell 18a a number of times and emerges through an opening in plate 24a. The magnetic field is established by means of a solenoid 120 which surrounds cell 18a. The axis of the solenoid is substantially parallel to the direction the light beam passes through cell 18a. This results in the magnetic field being parallel to the direction of the light beam. In this embodiment, the rotation ($\theta$) of the plane of polarization of the light beam is represented by the following formula:

$$\theta = \frac{4\pi\rho N I n}{10}$$

$N$ = number of turns of the solenoid
$I$ = current in amperes.

From the foregoing description of preferred embodiments of this invention, it should be evident that there is provided a novel analyzer for determining the composition of fluids in terms of the magneto-optical rotation of a beam of plane polarized light which is transmitted through the fluid. The degree of the magneto-optical rotation is a function of both temperature and pressure for gases and is a function of both temperature and density for liquids. Thus, it is desirable in most applications to transmit the fluid to be measured through the cell at constant temperatures and pressures in order to avoid errors due to these effects. While the invention has been described in conjunction with present preferred embodiments, it should be evident that it is not limited thereto.

What is claimed is:

1. An optical analyzer comprising a sample cell having radiation transparent windows, a source of monochromatic radiation, a polarizer, means to direct a first beam of radiation from said source through said polarizer and then through said cell a plurality of times along substantially parallel paths, means to establish a magnetic field across said cell in a direction parallel to the direction of radiation passage through said cell, a mirror assembly positioned to divide said first beam after passage through said cell into second and third beams, a first analyzer for polarized light disposed in said second beam, a second analyzer for polarized light disposed in said third beam, said first and second analyzers being disposed with respect to one another so that transmission of one is a maximum when the transmission of the other is about one-half of maximum, a first radiation detector positioned to receive the second beam transmitted through said first analyzer, a second radiation detector positioned to receive the third beam transmitted through said second analyzer, means responsive to said first and second detectors to establish an output signal representative of the difference between the amounts of radiation received by said first and second detectors, and means responsive to said output signal to rotate said analyzers in unison so that said analyzers retain the same positions relative to one another to vary the relative amounts of radiation impinging upon said detectors until said output signal is zero.

2. The combination in accordance with claim 1 wherein said means to establish a magnetic field comprises a magnet having spaced pole pieces with openings therein, said cell being positioned between said pole pieces so that said first radiation beam passes through said openings and said cell, and wherein said means to direct said first radiation beam through said cell a plurality of times comprises reflectors positioned at the ends of said cell.

References Cited in the file of this patent

UNITED STATES PATENTS

| 2,140,368 | Lyle | Dec. 13, 1938 |
| 2,362,832 | Land | Nov. 14, 1944 |
| 2,385,086 | D'Agostino et al. | Sept. 18, 1945 |
| 2,503,808 | Earl et al. | Apr. 11, 1950 |
| 2,668,470 | Fischer | Feb. 9, 1954 |
| 2,731,875 | Gould | Jan. 24, 1956 |

OTHER REFERENCES

"A Precision Faraday Effect Apparatus", Steingiser et al., The Review of Scientific Instruments, Vol. 21, No. 2, February 1950, pp. 109 to 114.

"A Sensitive Photoelectric Method for Measuring the Faraday Effect", Ingersoll et al., The Review of Scientific Instruments, Vol. 24, No. 1, January 1953, pp. 23–25.